(12) United States Patent
Tanaka

(10) Patent No.: US 10,848,742 B2
(45) Date of Patent: Nov. 24, 2020

(54) CONTENT GENERATION DEVICE, METHOD FOR CONTROLLING CONTENT GENERATION DEVICE, AND STORAGE MEDIUM

(71) Applicant: CANON KABUSHIKI KAISHA, Tokyo (JP)

(72) Inventor: Katsumasa Tanaka, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/502,208

(22) Filed: Jul. 3, 2019

(65) Prior Publication Data

US 2020/0021761 A1  Jan. 16, 2020

(30) Foreign Application Priority Data

Jul. 12, 2018  (JP) .................................. 2018-132638

(51) Int. Cl.
| | |
|---|---|
| *H04N 13/243* | (2018.01) |
| *H04N 5/367* | (2011.01) |
| *H04N 13/282* | (2018.01) |
| *H04N 13/279* | (2018.01) |
| *G06T 7/00* | (2017.01) |
| *H04N 13/111* | (2018.01) |
| *G06T 13/20* | (2011.01) |
| *H04N 13/117* | (2018.01) |

(52) U.S. Cl.
CPC ......... *H04N 13/243* (2018.05); *G06T 7/0002* (2013.01); *G06T 13/205* (2013.01); *H04N 5/3675* (2013.01); *H04N 13/111* (2018.05); *H04N 13/117* (2018.05); *H04N 13/279* (2018.05); *H04N 13/282* (2018.05); *G06T 2207/30168* (2013.01)

(58) Field of Classification Search
CPC .. H04N 13/243; H04N 13/111; H04N 13/117; H04N 5/3675; H04N 13/282; H04N 13/279; H04N 5/247; G06T 13/205; G06T 7/0002; G06T 2207/30168
See application file for complete search history.

(56) References Cited

U.S. PATENT DOCUMENTS

| | | | |
|---|---|---|---|
| 2018/0330163 A1* | 11/2018 | Matsuzaki | G06K 9/00624 |
| 2018/0352215 A1* | 12/2018 | Iwakiri | H04N 5/262 |
| 2018/0359458 A1* | 12/2018 | Iwakiri | H04N 13/167 |
| 2019/0228565 A1* | 7/2019 | Yushiya | G06T 15/205 |
| 2019/0335154 A1* | 10/2019 | Tanaka | G06F 3/04815 |

FOREIGN PATENT DOCUMENTS

JP  2015225529 A  12/2015

* cited by examiner

*Primary Examiner* — Shahbaz Nazrul
(74) *Attorney, Agent, or Firm* — Rossi, Kimms & McDowell LLP

(57) ABSTRACT

A content generation device is capable of generating moving-image virtual viewpoint content on a basis of a group of images captured with a plurality of image capturing devices. The content generation device comprises a determination unit configured to determine whether each image of the group of images captured with the plurality of image capturing devices has an abnormality on a basis of data associated with each image; and a method determination unit configured to determine a type of content to be generated among a plurality of types of content including the moving-image virtual viewpoint content in accordance of a determination of a presence or an absence of the abnormality.

11 Claims, 9 Drawing Sheets

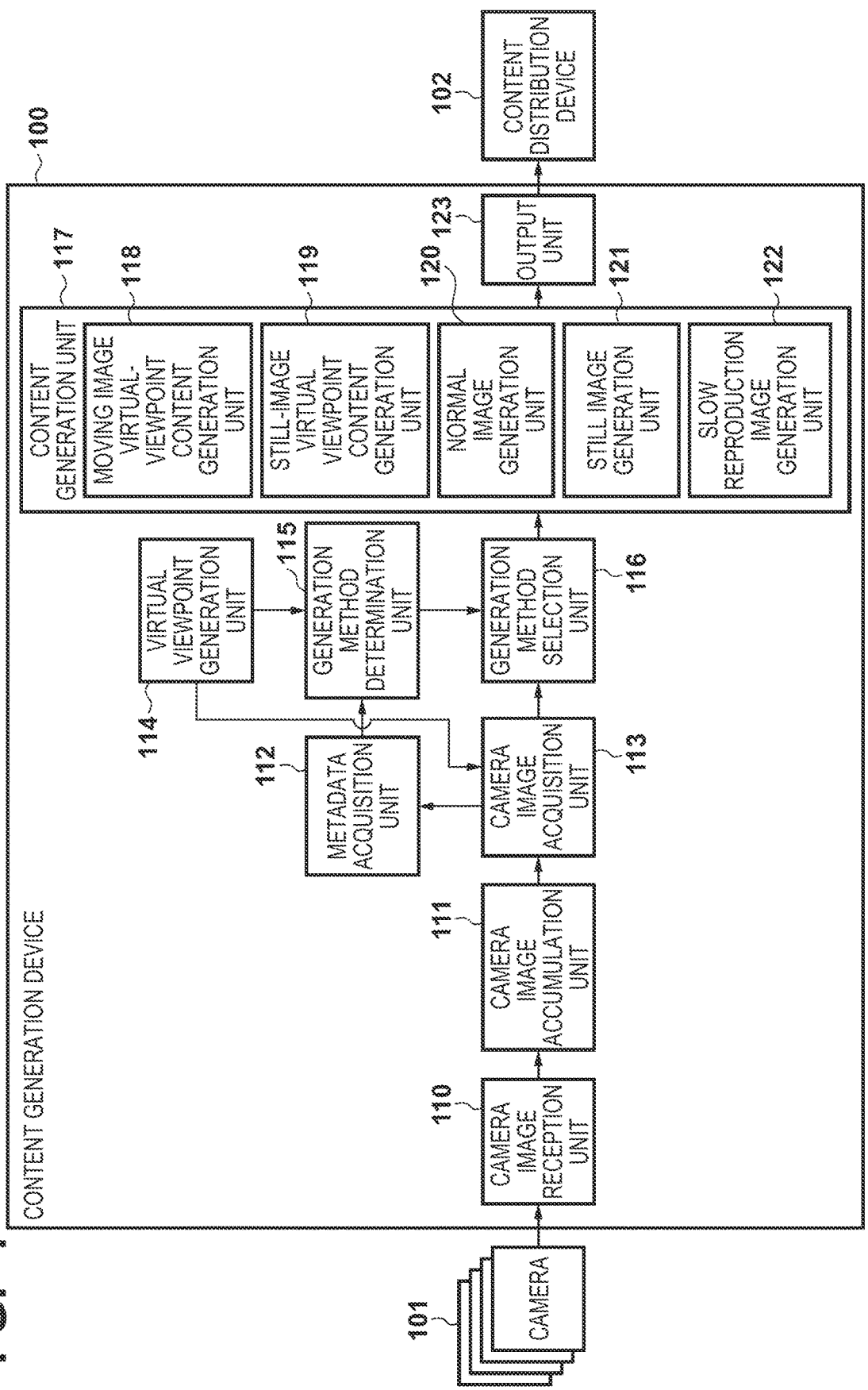

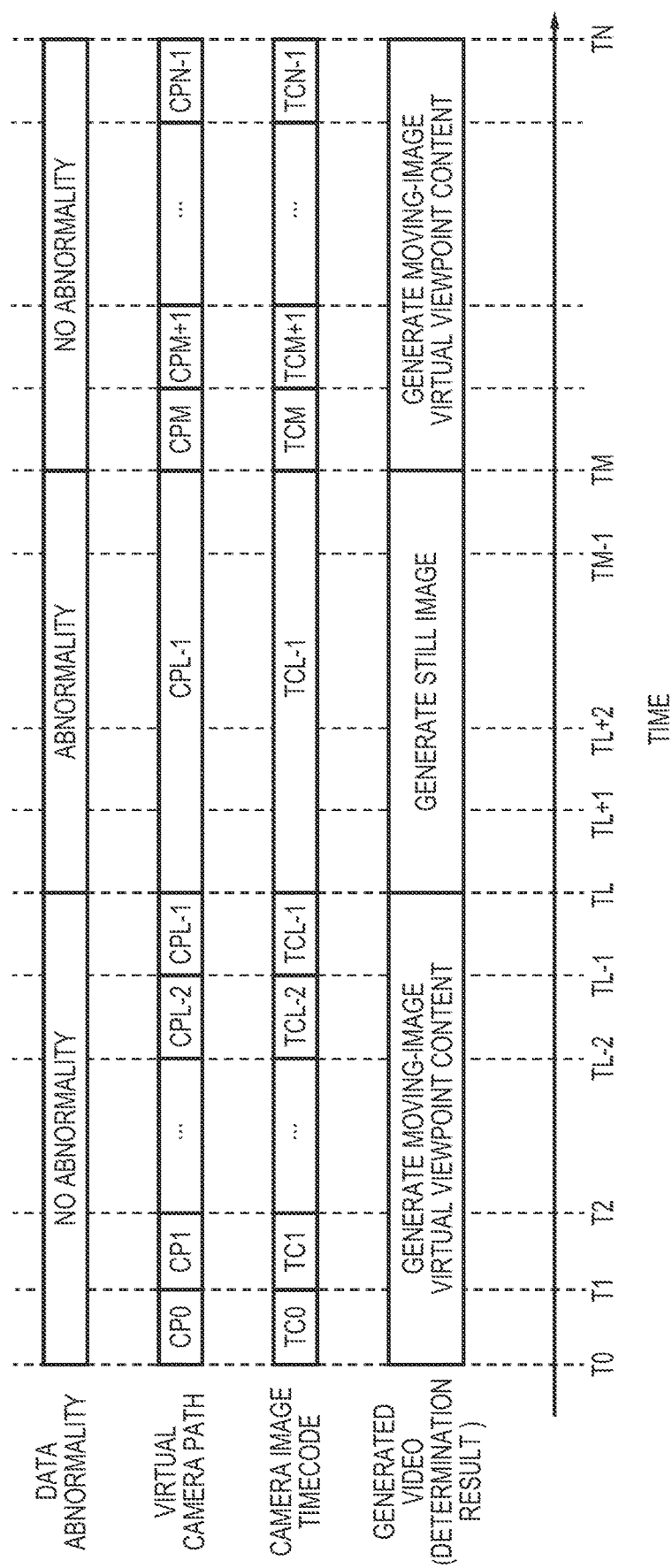

CONTENT GENERATION DEVICE, METHOD FOR CONTROLLING CONTENT GENERATION DEVICE, AND STORAGE MEDIUM

BACKGROUND OF THE INVENTION

Field of the Invention

The present invention relates to a content generation device, a method for controlling a content generation device, and a storage medium.

Description of the Related Art

In recent years, a technology has attracted attentions in which images are synchronously captured with a plurality of cameras disposed at different positions, and virtual viewpoint content is generated by using multiple-viewpoint images acquired by the capturing. According to this technique, for example, the highlights in soccer, basketball and the like can be viewed from various angles, thus a high presence can be given to a user.

Japanese Patent Laid-Open No. 2015-225529 discloses a technique for switching a method for generating image content in response to a request from a user. For example, a free viewpoint video (virtual viewpoint content) is generated in response to a free operation request and/or a live replay video (real-time video immediately after capturing and a replay video captured in the past) is generated in response to a request for a distribution of a live replay video.

Here, in a case of live streaming of virtual viewpoint content, the virtual viewpoint content is generated simultaneously with synchronous capturing of multiple viewpoints. In particular, in a case of live streaming of virtual viewpoint content of a moving image, simultaneous capturing of multiple viewpoints and generation of the virtual viewpoint content are simultaneously performed, and therefore, it is necessary that the captured images have already arrived by the time when the device that generates the virtual viewpoint content needs it.

However, in the technique disclosed in Japanese Patent Laid-Open No. 2015-225529, images may not have been arrived at the time of generating the virtual viewpoint content and image defects may occur due to various failures such as a breakdown of transmission lines or a defect of devices. Consequently, a time at which the image content to be distributed to the user cannot generate results, and the continuity of the image cannot be maintained, thus an uncomfortable image is provided to the user.

In view of the above-mentioned problems, the present invention provides a technique of providing virtual viewpoint content that is less uncomfortable for the user.

SUMMARY OF THE INVENTION

According to one aspect of the present invention, there is provided a content generation device capable of generating moving-image virtual viewpoint content on a basis of a group of images captured with a plurality of image capturing devices, the content generation device comprising: a determination unit configured to determine whether each image of the group of images captured with the plurality of image capturing devices has an abnormality on a basis of data associated with each image; and a method determination unit configured to determine a type of content to be generated among a plurality of types of content including the moving-image virtual viewpoint content in accordance of a determination of a presence or an absence of the abnormality.

Further features of the present invention will be apparent from the following description of exemplary embodiments with reference to the attached drawings.

BRIEF DESCRIPTION OF THE DRAWINGS

FIG. 1 illustrates an exemplary configuration of a content generation system according to an embodiment of the present invention.

FIG. 8 is a graph of data and determination results (still images) for a method according to a fifth example.

DESCRIPTION OF THE EMBODIMENTS

Figure 2A:
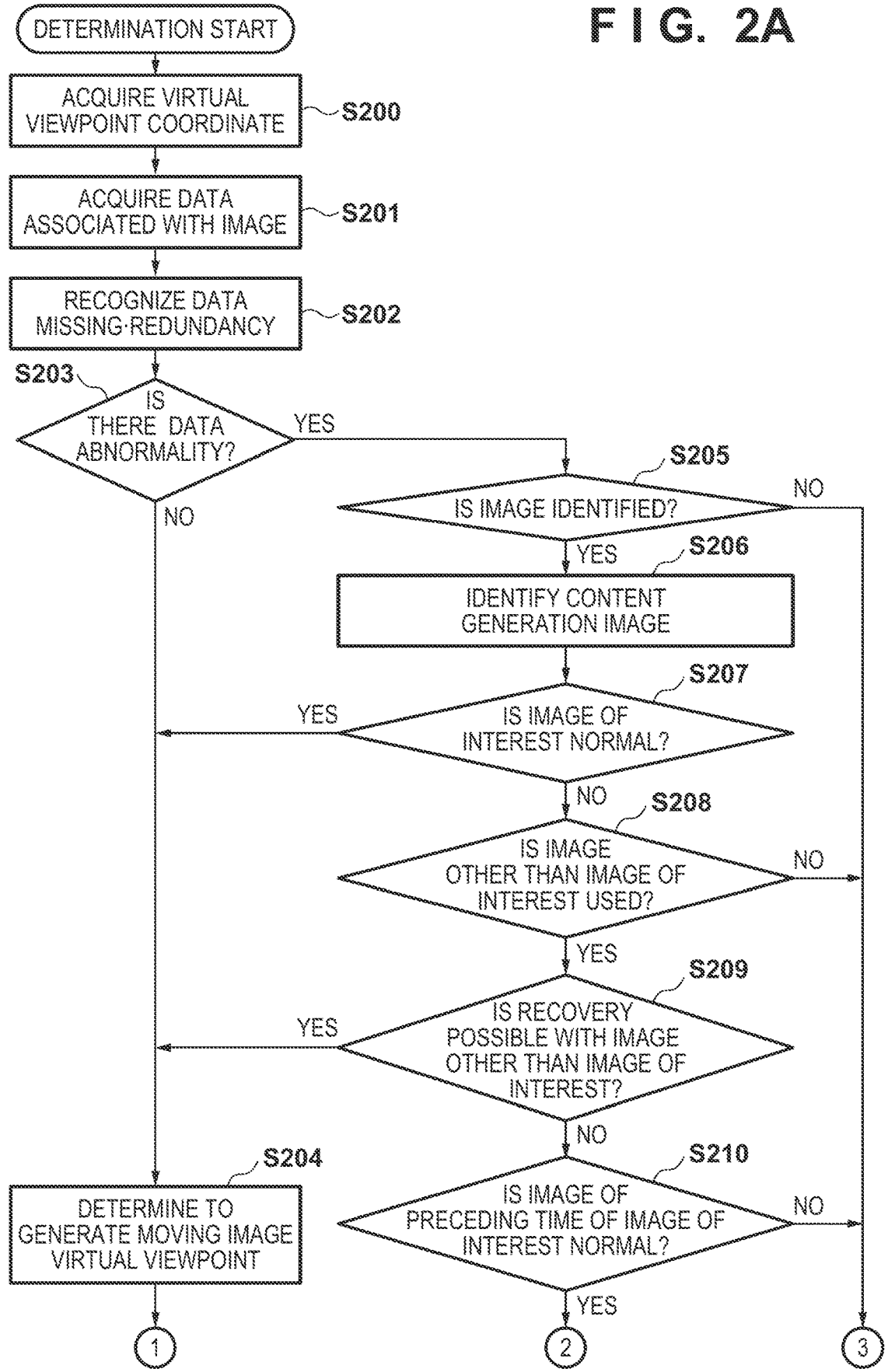
FIG. 2A and FIG. 2B are a flowchart illustrating a procedure of processes performed by a content generation device according to the embodiment of the present invention.

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

Summary

In the present embodiment, an example is described in which a failure (data abnormality) such as missing and redundancy of data, and a time mismatch is checked for each of images captured from different directions with a plurality of cameras, and content to be generated is determined from among contents of a plurality of types including moving-image virtual viewpoint content in accordance with the presence or absence of the data abnormality.

In the present embodiment, five types of image generation methods are provided. The types are moving-image virtual viewpoint content generation, still-image virtual viewpoint content generation, normal image generation, still image generation, and slow reproduction image generation. The moving-image virtual viewpoint content generation is a method for generating moving-image virtual viewpoint content. The moving-image virtual viewpoint content is a virtual viewpoint content that is generated by switching virtual viewpoint images for each instance of time from images captured with the plurality of cameras in a certain time period. Note that the position and direction of the virtual viewpoint (hereinafter, referred to as virtual viewpoint information) may or may not be changed for each instance of time. Specifically, the moving-image virtual viewpoint content is a virtual viewpoint content of a moving image including a frame image generated based on images captured with a plurality of cameras at a certain time and a virtual viewpoint corresponding to the certain time, and a frame image generated based on images captured with a plurality of cameras at another time and a virtual viewpoint corresponding to the another time. The still-image virtual viewpoint content generation is a method for generating still-image virtual viewpoint content. The still-image virtual viewpoint content is a virtual viewpoint content that is generated by switching virtual viewpoint images along a virtual camera path by using images captured with the plurality of cameras at a single time. Note that the virtual camera is a virtually provided camera differing from a plurality of cameras actually installed around the image capture region, and is a concept for convenience of description of a virtual viewpoint according to generation of a virtual viewpoint image. The virtual camera path is an information representing a movement path (transition) of the virtual viewpoint. That is, the still-image virtual viewpoint content is a virtual viewpoint content of a moving image including a frame image generated based on images captured with a plurality of cameras at a single time and a certain virtual viewpoint, and a frame image generated based on images captured with a plurality of cameras at that single time and another virtual viewpoint. The normal image generation is a method for generating a moving image of one camera selected from among a plurality of cameras. The still image generation is a method for generating a still image of a virtual viewpoint at a single time. Specifically, in the present embodiment, the still image is a virtual viewpoint content of a still image generated based on images captured with a plurality of cameras at a single time and a single virtual viewpoint.

Note that the still-image virtual viewpoint content is a content for displaying the virtual viewpoint image of each virtual viewpoint configuring a virtual camera path at a specific time by switching the image for each viewpoint over time. Content such as a moving image can be generated by displaying the virtual viewpoint image at a specific time by switching the image for each viewpoint and moving along the camera path over tithe, thus a less uncomfortable image can be provided to the user. In contrast, the still image is a content for continuously displaying over time a virtual viewpoint image at one virtual viewpoint at a specific time.

The slow reproduction image generation is a method for reproducing a moving-image virtual viewpoint content at a rate slower than a normal rate. To be more specific, the slow reproduction image generation is a method for continuously reproducing generated content until the time at which to generate the next content.

System Configuration and Device Configuration

FIG. 1 illustrates an exemplary configuration of a content generation system according to the present embodiment. The content generation system includes a camera group 101, a content generation device 100, a camera group 101, and a content distribution device 102.

The content generation device 100 continuously receives a group of images of multiple viewpoints synchronously captured with the camera group 101, generates virtual viewpoint contents and/or still images based on the virtual viewpoint information, and transmits the virtual viewpoint contents and/or the still images to the content distribution device 102. The camera group 101, which is composed of a plurality of cameras, associates metadata including a timecode, missing and redundancy of data, error information and a camera number with images of multiple viewpoints, and transmits the images with the metadata to the content generation device 100.

Next, operations of functional blocks provided inside the content generation device 100 will be described. The content generation device 100 includes a camera image reception unit 110, a camera image accumulation unit 111, a metadata acquisition unit 112, a camera image acquisition unit 113, a virtual viewpoint generation unit 114, a generation method determination unit 115, a generation method selection unit 116, a content generation unit 117, and an output unit 123. The operation of each processing unit is controlled by reading and executing a computer program stored in a memory (not illustrated) by a CPU (not illustrated).

The camera image reception unit 110, the camera image accumulation unit 111, and the camera image acquisition unit 113 acquire and transmit images. The metadata acquisition unit 112, the virtual viewpoint generation unit 114, and the generation method determination unit 115 process information associated with (related with) the image. The generation method selection unit 116, the content generation unit 117, and the output unit 123 process both the image and the information associated with the image.

The content generation unit 117 includes a moving-image virtual viewpoint content generation unit 118, a still-image virtual viewpoint content generation unit 119, a normal image generation unit 120, a still image generation unit 121, and a slow reproduction image generation unit 122.

The camera image reception unit 110 receives a captured image of each instance of time and information associated with the image from the camera group 101, and transmits the image and the information to the camera image accumulation unit 111.

The camera image accumulation unit 111 receives the image and the information associated with the image from the camera image reception unit 110, and stores the image and the information in a storage device provided inside the camera image accumulation unit 111. Then, the image and the information associated with the image are transmitted in response to a request from the camera image acquisition unit 113. In a case where the time information of the image requested by the camera image acquisition unit 113 is close to the time at which it is stored in the storage device, the image and the information may be transmitted without being stored in the storage device, or may be transmitted to the camera image acquisition unit 113 and being stored in the storage device at the same time.

The camera image acquisition unit 113 makes a request for the image to the camera image accumulation unit 111 and acquires a required image. Also, the information associated with the image is acquired together with the image. The information for the request of a required image is time information associated with virtual viewpoint information that is received from the virtual viewpoint generation unit 114. That is, all of the images at that time are received. Note that, in a case where the image to be used has been determined, only the corresponding image may be received. Then, after separating the image and the information associated with the image from each other, the image is transmitted to the generation method selection unit 116, and the information associated with the image is transmitted to the metadata acquisition unit 112.

The metadata acquisition unit 112 determines whether the image is normal or abnormal on the basis of the information acquired from the camera image acquisition unit 113. The information acquired from the camera image acquisition unit 113 includes time information of the image, information indicating whether the data abnormality occurs, and virtual viewpoint information. The data abnormality include missing, redundancy, and errors of data. The data abnormality may include time mismatches. Whether the image is correct is determined based on the above-mentioned information indicating whether data abnormality occurs, and the determination result is transmitted to the generation method determination unit 115.

The virtual viewpoint generation unit 114 generates virtual viewpoint information on the basis of a request from an operator of the content generation device 100. The virtual viewpoint information is information representing a position and a direction of a viewpoint requested by the operator regardless of the position where the camera group 101 is installed. As the virtual viewpoint information exists for each instance of time, the position and coordinate of the virtual viewpoint may be the same as the preceding time. Then, the generated virtual viewpoint information is transmitted to the generation method determination unit 115 and the camera image acquisition unit 113. Note that the transmission to the camera image acquisition unit 113 may be performed from the generation method determination unit 115.

The generation method determination unit 115 determines the generation method of the virtual viewpoint content on the basis of the virtual viewpoint information acquired from the virtual viewpoint generation unit 114 and the information associated with the image acquired from the metadata acquisition unit 112. Then, the determination result is transmitted to the generation method selection unit 116. The method for determining the generation method will be described later.

The generation method selection unit 116 receives an image from the camera image acquisition unit 113, and receives information associated with the image and a determination result on the method for generating virtual viewpoint content from the generation method determination unit 115. Then, a control is performed so as to operate any of the generation units of the content generation unit 117. Note that the image may not be received from the camera image acquisition unit 113, and the image may be received from the generation method determination unit 115.

The content generation unit 117 acquires an image, information associated with the image, and a determination result on the method for generating content from the generation method selection unit 116, and generates content. Then, the generated content is transmitted to the output unit 123.

The moving-image virtual viewpoint content generation unit 118 generates moving-image virtual viewpoint content on the basis of the operation command from the generation method selection unit 116. The still-image virtual viewpoint content generation unit 119 generates still-image virtual viewpoint content on the basis of the operation command from the generation method selection unit 116.

The normal image generation unit 120 outputs the selected image on the basis of the operation command from the generation method selection unit 116. The method for selecting the image will be described below. The still image generation unit 121 transmits the image output at the preceding time on the basis of the operation command from the generation method selection unit 116. The slow reproduction image generation unit 122 receives the operation command from the generation method selection unit 116, and outputs either the virtual viewpoint content output at the preceding time or the virtual viewpoint content generated at the current time.

The output unit 123 receives the content generated by the content generation unit 117 and outputs the received content to the content distribution device 102. The user can view the content displayed via the content distribution device 102.

Processes

Next, a procedure of processes performed by a content generation device according to an embodiment of the present invention will be described with reference to the flowchart of FIG. 2A and FIG. 2B. First, the whole flow of the processes is described, and specific examples of generation of content of each type will be described later.

In step S200, the generation method determination unit 115 acquires virtual viewpoint information from the virtual viewpoint generation unit 114. In step S201, the generation method determination unit 115 acquires time information and information associated with an image from the metadata acquisition unit 112. In step S202, the generation method determination unit 115 checks data abnormalities (e.g., missing, redundancy, and errors of data, and the like) of the image on the basis of the information associated with the image acquired from the metadata acquisition unit 112.

In step S203, the generation method determination unit 115 determines whether there is a data abnormality in the image on the basis of the result of the check in step S202. When there is a data abnormality, the process proceeds to step S205. On the other hand, when there is no data abnormality in the image, the process proceeds to step S204.

In step S204, the generation method determination unit 115 determines to generate the content by using the moving-image virtual viewpoint content generation unit 118 of the content generation unit 117. Then, the process proceeds to step S218.

In step S205, the generation method determination unit 115 determines whether to identify the image required for generating the moving-image virtual viewpoint content on the basis of the setting of the operator. Prior to the start of the processes, the operator preliminarily sets whether to identify the image required for generating the moving-image virtual viewpoint content in a case where there is a data abnormality in the image. Alternatively, an input of the setting may be received from the operator at this timing so as to make a determination based on the received setting. Further, this may be performed at another timing. The operator can input a command to the content generation device 100 by operating an operation unit (not illustrated). Alternatively, a configuration may be adopted in which a command of setting is input via other devices such as the content distribution device 102, and the information representing the settings is transmitted to the content generation device 100 to reflect the setting. The same applies to other operator settings. When the image is identified, the process proceeds to step S206. On the other hand, when the image is not identified, the process proceeds to step S214.

In step S206, the generation method determination unit 115 identifies the image required for generating the moving-image virtual viewpoint content. The identification of the image is performed using the virtual viewpoint information obtained in step S200.

In step S207, the generation method determination unit 115 checks whether the image identified in step S206 corresponds to the data abnormality confirmed in step S202. In other words, to determine whether the image of interest is normal. When the image of interest is normal, the process proceeds to step S204. On the other hand, when the image of interest is not normal, the process proceeds to step S208.

In step S208, the generation method determination unit 115 determines whether to generate an alternative image for the image corresponding to a data abnormality by using another image that does not correspond to the data abnormality on the basis of the setting of the operator. In other words, to determine whether an image other than the image of interest is used. Prior to the start of the processes, the operator sets whether to generate an alternative image for the image corresponding to a data abnormality by using another image that does not correspond to the data abnormality. Alternatively, an input of the setting may be received from the operator at this timing so as to make a determination based on the received setting. Further, this may be performed at another timing. When an alternative image is generated, i.e., when an image other than the image of interest is used, the process proceeds to step S209. On the other hand, when not an alternative image is not generated, i.e., when an image other than the image of interest is not used, the process proceeds to step S214.

In step S209, the generation method determination unit 115 determines whether an alternative image of the image that corresponds to the data abnormality in step S207 can be generated from another image that does not correspond to the data abnormality. In other words, to determine whether the replacement using an image that is not the image of interest can be performed. The generation method determination unit 115 makes this determination on the basis of focus information, a coordinate and an angle of view included in internal parameters and external parameters of the camera. When the alternative image can be generated, the process proceeds to step S204. On the other hand, when the alternative image cannot be generated, the process proceeds to step S210.

In step S210, the generation method determination unit 115 checks the data abnormality in the image of the time immediately preceding the current time. In other words, the generation method determination unit 115 determines whether the image of the preceding time of the image of interest is normal. When the image of the preceding time is normal, the process proceeds to step S211. On the other hand, when the image of the preceding time is not normal, the process proceeds to step S214.

In step S211, the generation method determination unit 115 checks the data abnormality in the image of the time immediately succeeding the current time. In other words, the generation method determination unit 115 determines whether the image of the succeeding time of the image of interest is normal. When the image of the succeeding time is normal, the process proceeds to step S213. On the other hand, when the image of the succeeding time is not normal, the process proceeds to step S212. Note that, in the process of step S211, when the capturing time of the camera group 101 and the timecode associated with the virtual viewpoint information generated by the virtual viewpoint generation unit 114 are close to each other, the process may be uniquely determined to proceed to step S212.

In step S212, the generation method determination unit 115 determines to generate the content by using the still-image virtual viewpoint content generation unit 119 of the content generation unit 117. Then, the process proceeds to step S218. In step S213, the generation method determination unit 115 determines to generate the content by using the slow reproduction image generation unit 122 of the content generation unit 117. Then, the process proceeds to step S218.

In step S214, the generation method determination unit 115 determines whether to switch to a normal image. For example, the determination may be made based on the setting of the operator and/or the frequency of the data abnormality. The operator preliminarily makes a setting as to whether to switch the image to a normal image. Alternatively, an input of a setting may be received from the operator so as to make a determination based on the received setting. When the image is switched to a normal image, the process proceeds to step S215. On the other hand, when the image is not switched to a normal image, the process proceeds to step S216.

In step S215, the generation method determination unit 115 determines to generate a normal image. Then, the process proceeds to step S217. In step S216, the generation method determination unit 115 determines to generate a still image. Then, the process proceeds to step S218.

In step S217, the generation method determination unit 115 selects one camera to be used. As an example of the criteria of the selection, a camera that is located at a position closest to the position indicated by the virtual viewpoint information and captures in the same direction as the direction indicated by the virtual viewpoint information is selected. Other selection criterias may also be adopted. Then, the process proceeds to step S218.

In step S218, the generation method determination unit 115 transmits the determination result of any of steps S204, S212, S213 S215 and S216 and the virtual viewpoint information acquired from the virtual viewpoint generation unit 114 to the generation method selection unit 116. Note that, in a case where it is determined in step S215 to generate a normal image, this determination result, the virtual viewpoint information acquired from the virtual viewpoint generation unit 114, and the selected camera information are transmitted. Additionally, in a case where it is determined in step S216 to generate a still image, this determination result, the virtual viewpoint information acquired from the virtual viewpoint generation unit 114, and information indicating that the image transmitted at the time immediately preceding the current time should be transmitted also at the current time. Thus, the series of processes of FIG. 2A and FIG. 2B is terminated.

As described above, according to the present embodiment, the images of multiple viewpoints that are synchronously captured are checked. Thus, moving-image virtual viewpoint content can be generated even when a data abnormality occurs in an image provided that the image having the data abnormality is not required for generating the moving-image virtual viewpoint content. Alternatively, even when an image required for generating moving-image virtual viewpoint content has a data abnormality, the moving-image virtual viewpoint content can be generated by interpolating the virtual viewpoint image provided that an alternative image can be used.

Even when a data abnormality occurs in the image, alternative virtual viewpoint content methods (the still-image virtual viewpoint content generation, the slow reproduction image generation, the normal image generation, and the still image generation) can be selected to replace the moving-image virtual viewpoint content. Thus, a less uncomfortable image can be provided to the user even when a data abnormality occurs.

FIRST EXAMPLE

Flow of Processes of Moving-image Virtual Content Viewpoint Generation

Here, in the flowchart of FIG. 2A and FIG. 2B, in a case where there is no data abnormality in step S203, it is determined to generate the moving-image virtual viewpoint content in step S204 as described below with reference to FIG. 4. Alternatively, even in a case where there is a data abnormality, when the image required for generating the moving-image virtual viewpoint content is identified from the virtual viewpoint information and the image of interest is normal, it is determined to generate the moving-image virtual viewpoint in step S204. Further, in a case where the image of interest is not normal but can be substituted with an alternative image, it is determined to generate the moving-image virtual viewpoint content in step S204. Note that whether to identify the image required for generating the moving-image virtual viewpoint content from virtual viewpoint information may be determined on the basis of the setting of the operator.

Processing Results of Moving-Image Virtual Content Viewpoint Generation

Figure 4:
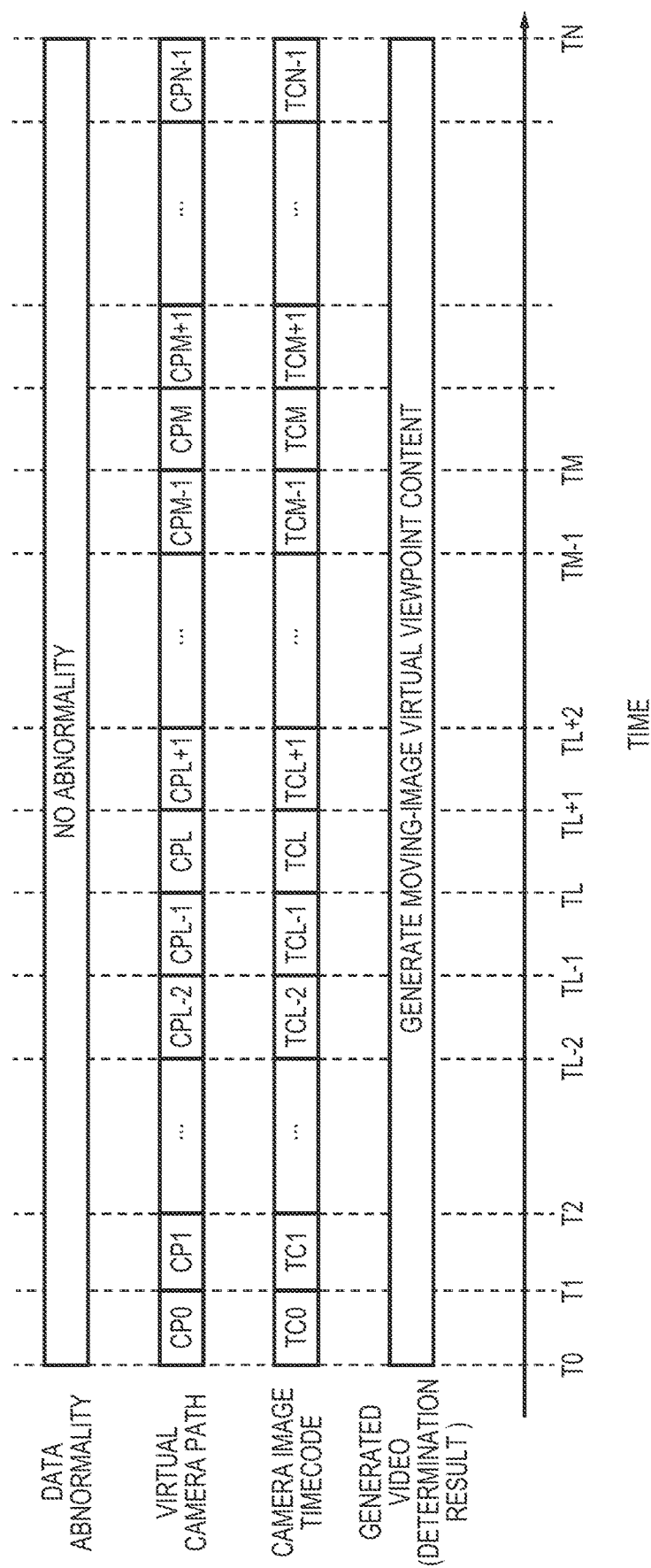
FIG. 4 is a graph of data and determination results (moving-image virtual viewpoint content) for a generation method according to a first example.

Here, FIG. 4 is an exemplary graph illustrating a determination result, a virtual camera path, and a timecode of an image for each instance of time of a case where there is no data abnormality and moving-image virtual viewpoint content is generated.

The horizontal axis represents the time. The time, which is indicated with an initial T, proceeds in the order of T0, TL, TM and TN. The virtual camera path, which is indicated with initials CP, proceeds in the order of CP0, CPL, CPM and CPN. The timecode of the image, which is indicated with initials TC, proceeds in the order of TC0, TCL, TCM and TCN.

The example illustrated in the drawing is a case where there is no data abnormality, and all determination results correspond to moving-image virtual viewpoint content generation at times T0 to TN, and therefore, the virtual camera path is composed of the virtual viewpoint information associated with the timecode of the image. For example, from time TL−2 to TL−1, the timecode of the image at the same time as the virtual viewpoint information CPL−2 is TCL−2.

For example, from TL−2 to TL−1, an image of the timecode TCL−2 in the virtual camera path CPL−2 is displayed. Then, in TL−1 to TL, an image of the timecode TCL−1 in the virtual camera path CPL−1 is displayed. Likewise, the moving image of each instance of time is displayed and moves along the virtual camera path over time.

Note that even in a case where there is a data abnormality, the moving-image virtual viewpoint content is generated throughout the entire period in the same manner as in FIG. 4 when the data abnormality exists in an image of a camera that is not required for generating the moving-image virtual viewpoint content and no data abnormality exists in the required image. Further, even in a case where a transmission delay of the multiple-viewpoint image has occurred, a moving-image virtual viewpoint content can be generated from the images already held in some situation.

Moving-image virtual viewpoint content is generated throughout the entire period as in FIG. 4 also in the case where there is a data abnormality in the image of the camera required for generation of the moving-image virtual viewpoint content but the image can be replaced with an alternative image.

As described above, according to the present embodiment, it is possible to generate moving-image virtual viewpoint content even in the case where failures such as data missing and a transmission delay of the multiple-viewpoint image occur, and thus it is possible to increase the possibility that a less uncomfortable image can be provided to the user.

SECOND EXAMPLE

A second example describes an operation of generating still-image virtual viewpoint content by determining the image generation method in the case where failures such as missing and redundancy of data, and a time mismatch occur in an image captured with a plurality of cameras.

Figure 3:
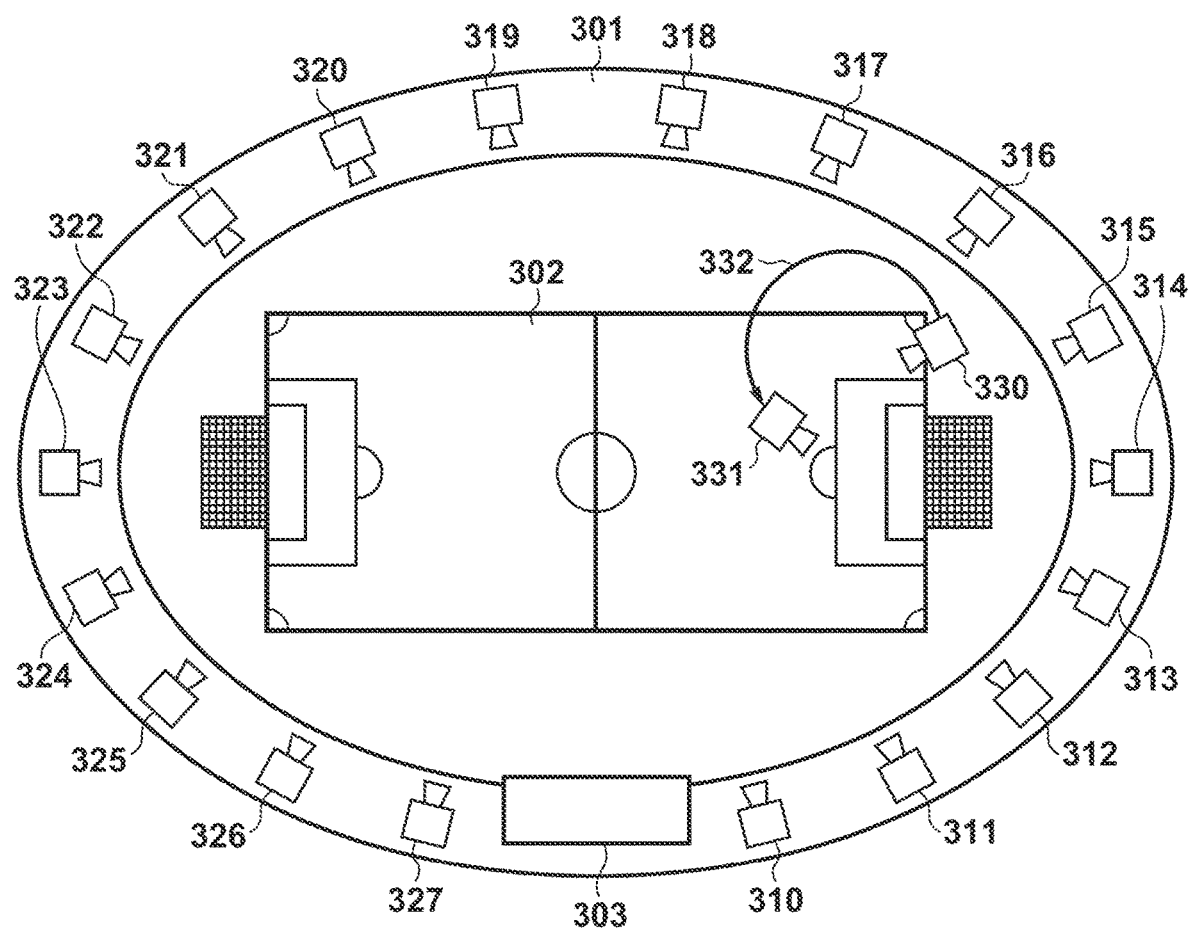
FIG. 3 is a diagram illustrating an exemplary camera installation and an exemplary virtual viewpoint movement (virtual camera path) according to the embodiment of the present invention.

Exemplary Camera Installation and Virtual Camera Path of Virtual Viewpoint Information Here, FIG. 3 is an exemplary installation of cameras in a stadium according to an embodiment of the present invention. A stadium 300 includes a stand 301, a field 302, and a broadcasting room 303. In addition, cameras 310 to 327 are cameras installed on the stand 301, and camera group 101 is composed of the cameras 310 to 327. A virtual camera 330 is a start point of a virtual viewpoint, and a virtual camera 331 is an endpoint of the virtual viewpoint. A virtual camera path 332 is an exemplary virtual camera path indicating a transition from the start point to the end point of the virtual viewpoint in the stadium 300.

Flow of Processes of Still-Image Virtual Viewpoint Content

The case where a camera image to be used is identified in the operation of step S207 described with reference to the flowchart of FIG. 2A and FIG. 2B will be described with the virtual camera 330, which is the start point of the virtual viewpoint of the virtual camera path 332. A virtual viewpoint content based on the virtual camera 330 is generated by using images of a camera 314, a camera 315, a camera 316, and a camera 317. In this case, even when a data abnormality is detected in the image of the camera 326, it is determined that the image of interest is normal since the image of the camera 326 is not an image required for generating the virtual viewpoint content, and the process proceeds to step S204.

On the other hand, when the data abnormality is detected in the image of the camera 315, it is determined that the image of interest is not normal and the process proceeds to step S208. Further, in the case where an alternative image cannot be generated from images other than the image of interest (Yes in step S208, No in S209), still-image virtual viewpoint content is generated by using the image of the preceding time of the image of interest (steps S210 to S212).

Processing Results of Still-Image Virtual Viewpoint Content Generation

Figure 5:
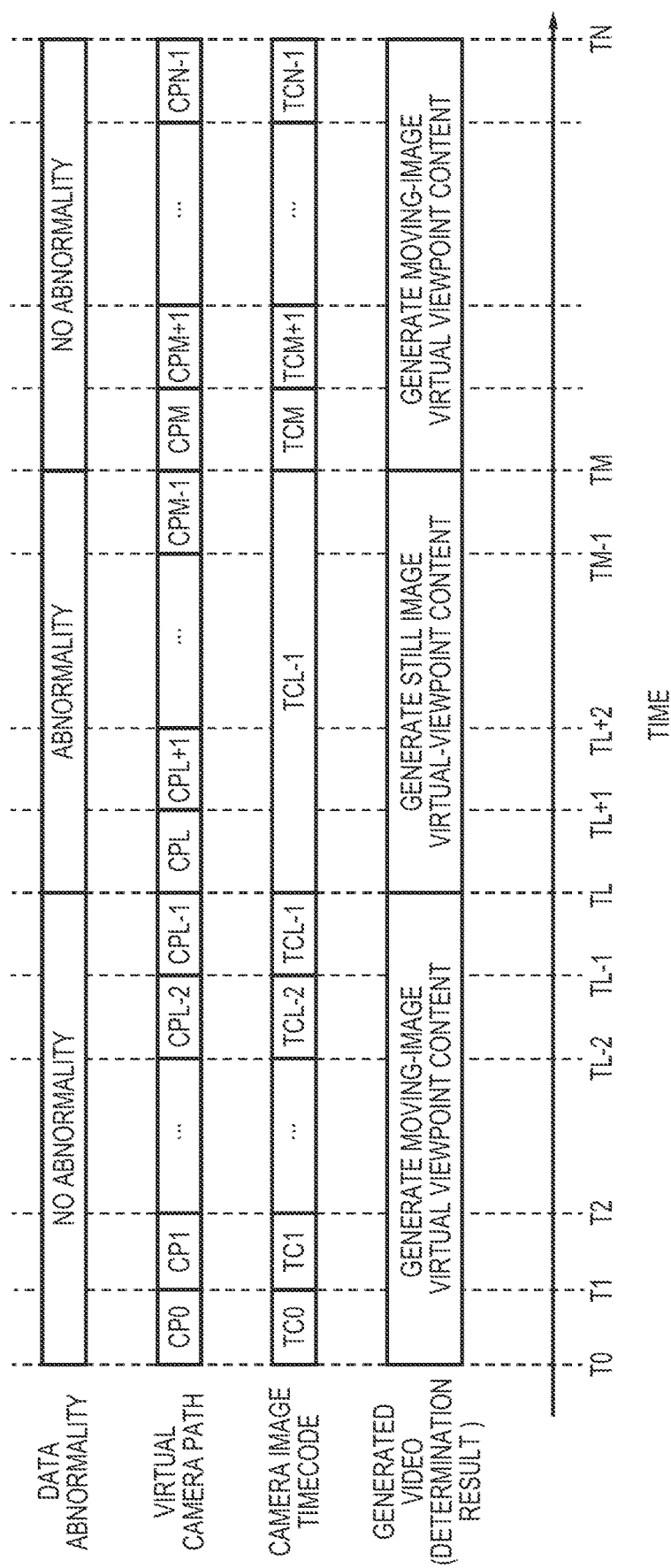
FIG. 5 is a graph of data and determination results (still-image virtual viewpoint content) for a generation method according to a second example.

FIG. 5 is an exemplary graph illustrating a determination result, a virtual camera path and a timecode of an image for each instance of time in the case where still-image virtual viewpoint content is generated.

In the illustrated example, at times TL to TM, it is determined to generate still-image virtual viewpoint content on the basis of the operations described above. As a result, the virtual camera path uses the same data as that of the case where there is no data abnormality, while the timecode of the image is the same as that used at times TL−1 to TL. At TL to TL+1, a virtual viewpoint image at the virtual viewpoint of the virtual camera path CPL (an image corresponding to timecode TCL−1) is displayed. Then, at TL+1 to TL+2, a virtual viewpoint image at the virtual viewpoint of the virtual camera path CPL+1 (an image corresponding to the timecode TCL−1) is displayed. The same applies thereafter.

As a result, the virtual viewpoint information is updated by using an image captured at the same time, and thus still-image virtual viewpoint content like a content is generated. Then, at times TM to TN, the data abnormality is transitioned to a normal state, and the timecode of the image synchronized with the time is used.

As described above, in the present embodiment, at the time when the data abnormality is found during generation of the moving-image virtual viewpoint content, as long as the image of the time immediately preceding that time is normal, the image is switched such that still-image virtual viewpoint content like a video is generated continuously from the time immediately preceding the current time. Thus, less uncomfortable images can be provided to the user.

THIRD EXAMPLE

A third example describes an operation of generating a slow reproduction image by determining the image generation method in the case where failures such as missing and redundancy of data, and a time mismatch occur in an image captured with a plurality of cameras.

Flow of Processes of Slow Reproduction Image

Figure 2B:
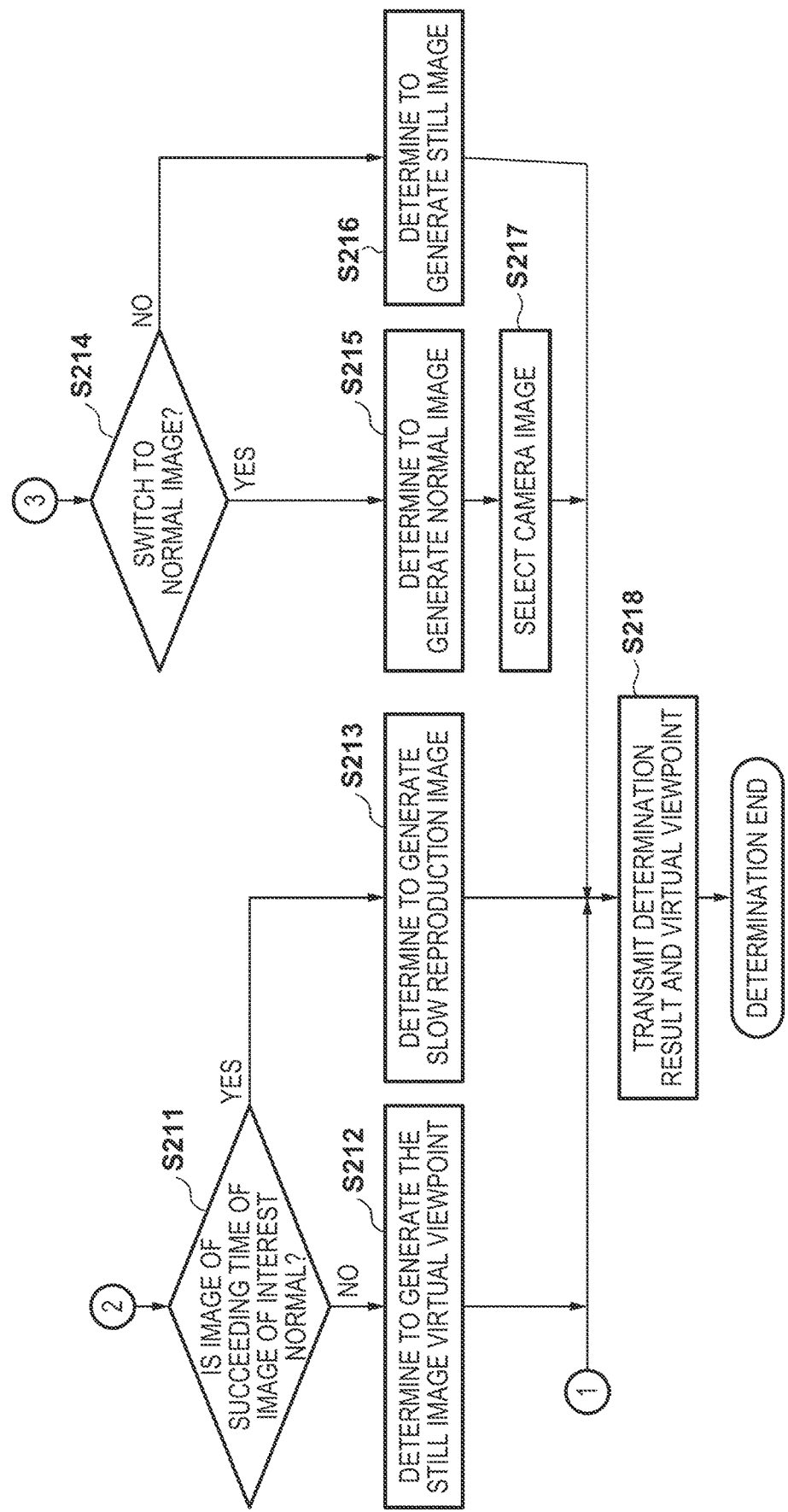

Regarding the steps before S210 in FIG. 2A and FIG. 2B, the flow of the processes of the still-image virtual viewpoint content is the same as that described in the second example. When an alternative image cannot be generated from images other than the image of interest (Yes in step S208, No in S209), the image of the preceding time of the image of interest and the image of the succeeding time of the image of interest are used to generate a slow reproduction image (Yes in steps S210 and S211, S213).

Processing Results of Slow Reproduction Image Generation

Figure 6:
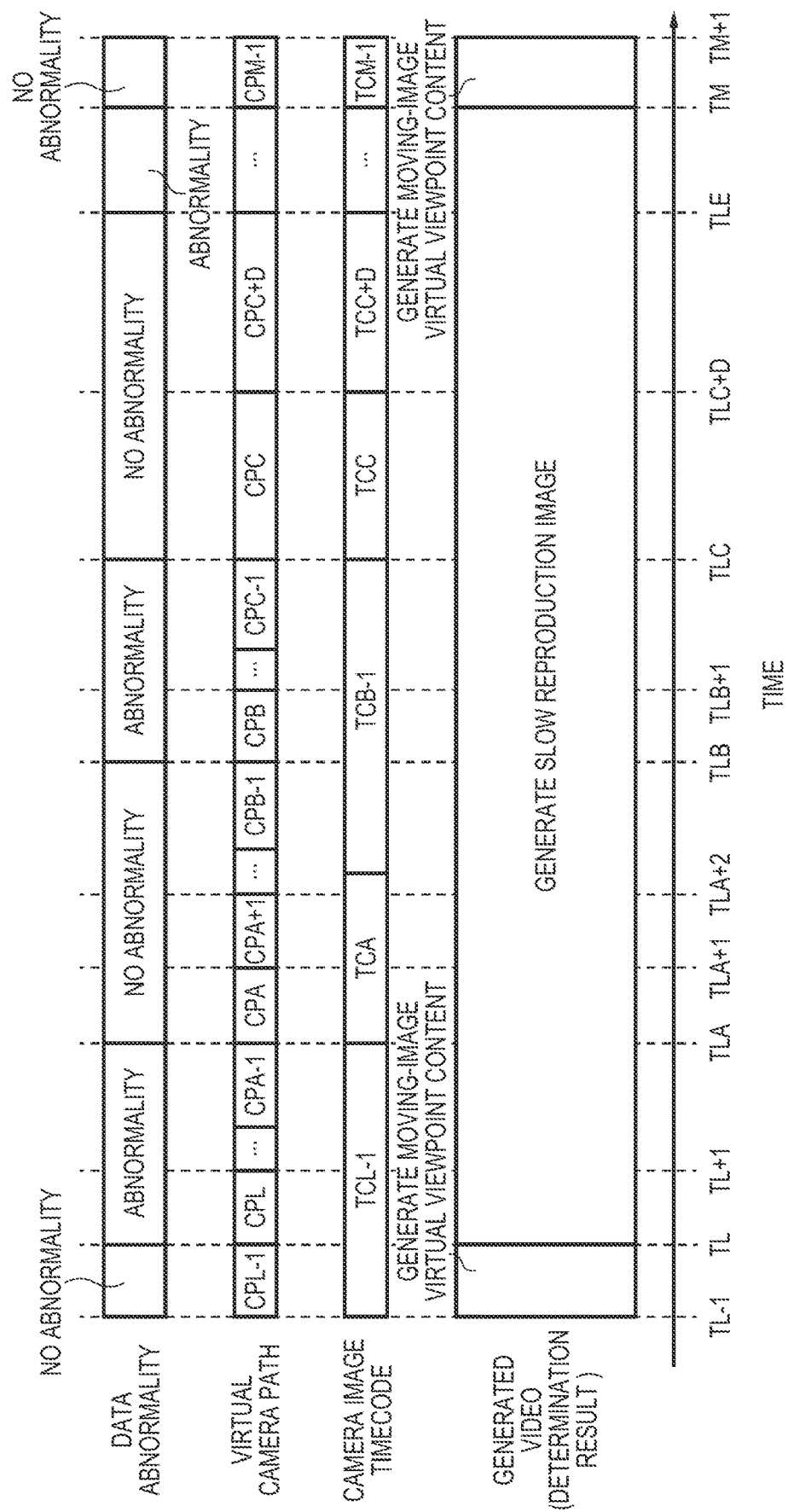
FIG. 6 is a graph of data and determination results (slow reproduction image) for a generation method according to a third example.

FIG. 6 is an exemplary graph illustrating a determination result, a virtual camera path, and a timecode of an image for each instance of time in the case where a slow reproduction image is generated.

In the illustrated example, at times TL to TM, a data abnormality is recognized at times TL to TLA, TLB to TLC, and TLE to TM, and accordingly it is determined to generate a slow reproduction image by checking whether there is a data abnormality in the images of times immediately preceding and succeeding the current time.

In the process of generating a slow reproduction image, the update rate of the virtual viewpoint information and the update time of the timecode of the image to be used may be different. For example, this corresponds to the operations at times TL to TLA and times TLB to TLC. In addition, the update rate of the virtual viewpoint information and the update time of the timecode of the image to be used are synchronized but may not be updated for each instance of time. For example, this corresponds to the operations at times TLC to TLE.

In addition, after generation of a slow reproduction image has been determined and a transition thereto has been made, a transition to other content generations is made under a condition that a time where there is no data abnormality continuing for a predetermined period. The reason for this configuration is that a data abnormality sporadically occurs in a case of the transition to the slow reproduction image, that it requires a period for recognizing settlement of the data abnormality, and that slow reproduction cannot be configured by a single time, and so on.

As described above, according to the present embodiment, a continuous image can be provided to the user while considering a data abnormality at times immediately preceding and succeeding the time when a data abnormality is found during generation of the moving-image virtual viewpoint content. This allows the user to view less uncomfortable images.

FOURTH EXAMPLE

A fourth example describes an operation of generating a normal image (a moving image by one of a plurality of cameras) by determining the image generation method in the case where failures such as missing and redundancy of data, and a time mismatch occur in an image captured with a plurality of cameras.

Flow of Processes of Normal Image Generation

When it is determined in the flowchart of FIG. 2A and FIG. 2B that the image of interest required for generating moving-image virtual viewpoint content is not identified in step S205, the process proceeds to step S214. In addition, when it is determined in step S208 that an image that is not the image of interest is not used, the process proceeds to step S214. Alternatively, when it is determined in step S210 that the image of the preceding time of the image of interest is not normal, the process proceeds to step S214. Then, in step S214, whether to switch to a normal image by an arbitrary camera that is not a virtual viewpoint image is determined based on a setting of the operator, and when the switching is determined to be performed, it is determined to generate a normal image in step S215. Further, one camera of interest is selected in step S217. The camera may be a camera at a position closest to the virtual viewpoint or may be a camera that faces a direction closest to that of the video of the virtual viewpoint (a camera that captures a composition closest to that of the video of the virtual viewpoint). Thus, an image with reduced uncomfortableness can be provided to the user.

Processing Results of Normal Image Generation

Figure 7:
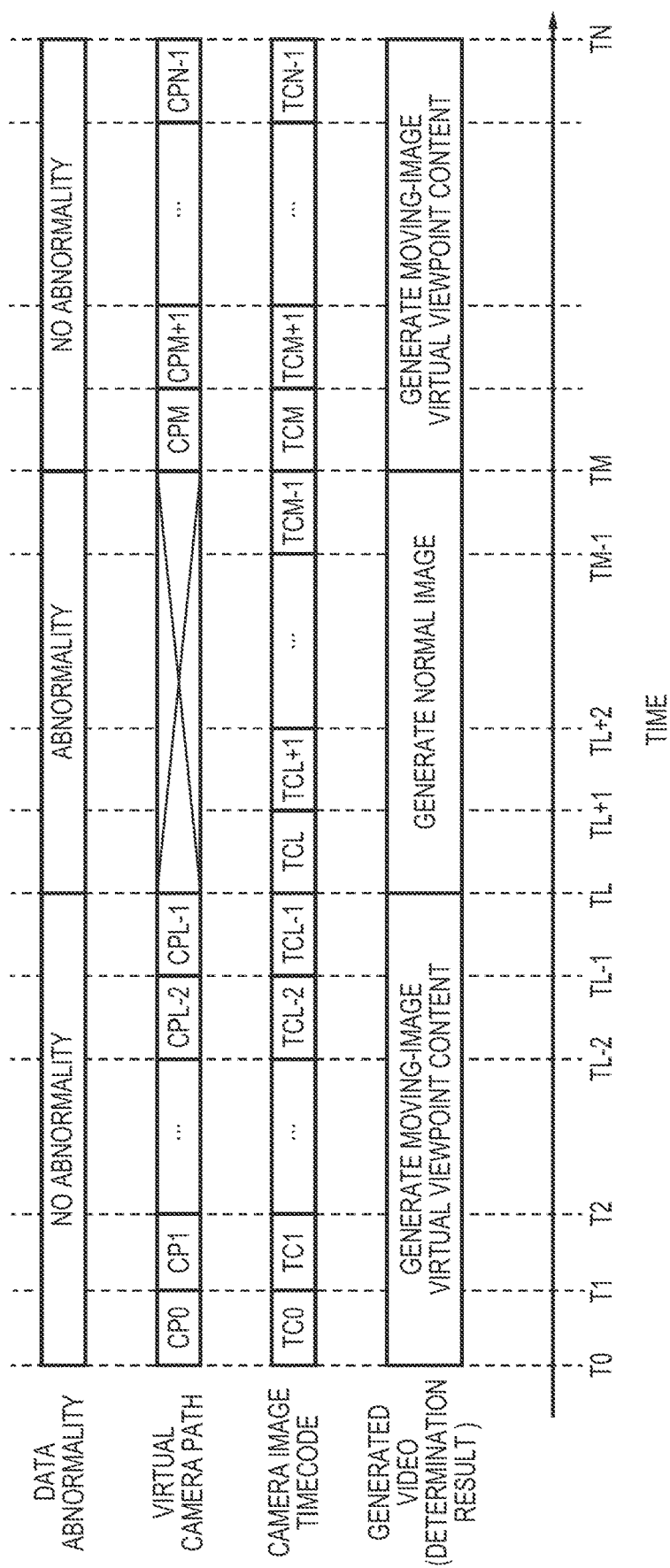
FIG. 7 is a graph of data and determination results (normal images) for a generation method according to a fourth example.

FIG. 7 is an exemplary graph illustrating a determination result, a virtual camera path, and a timecode of an image for each instance of time in the case where a normal image is generated.

In the illustrated example, at times TL to TM, the data abnormality of the image is recognized and it is determined to generate a normal image. In this case, the timecode is the same as in the case where there is no data abnormality, but no virtual camera path is used. Information of a selected camera is used as alternative information. The information of the camera may be an ID or a coordinate. As a result, at times TL to TM, an image of the selected camera is transmitted.

As described above, according to the present embodiment, in the case where the virtual viewpoint content is not generated, the image is switched to the image of a specific camera (e.g., a camera located at a position closest to the virtual viewpoint where images have been generated, a camera that captures a composition closest to that of the video of the virtual viewpoint). This allows the user to view less uncomfortable images.

FIFTH EXAMPLE

A fifth example describes an operation of generating a still image (a still image at one virtual viewpoint at a certain time) by determining the image generation method in the case where failures such as missing and redundancy of data, and a time mismatch occur in an image captured with a plurality of cameras.

Flow of Processes of Still Image Generation

Regarding the steps before S214 in FIG. 2A and FIG. 2B, the flow of processes of the normal image is the same as that described in the fourth example. When the image is not switched to the normal image (No in step S214), it is determined to generate a still image in step S216.

Processing Results of Still Image Generation

FIG. 8 is an exemplary graph illustrating a determination result, a virtual camera path, and a timecode of an image in the case where a still image is generated.

In the illustrated example, at times TL to TM, the data abnormality of the image is recognized and it is determined to generate a still image. In this case, the timecode and the virtual camera path of the image use the same virtual viewpoint as the time immediately preceding the current time and the image of the time immediately preceding the current time is continuously transmitted, thus outputting a still image.

As described above, according to the present embodiment, the user can view an image with less uncomfortableness.

The present invention allows for providing virtual viewpoint content that is less uncomfortable for the user.

Note that some or all of the processes in S205 to S211 in FIG. 2A and FIG. 2B may be omitted. For example, when the processes of S205 to S209 are omitted and a data abnormality is detected at S203, processes after S210 may be performed.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-132638, filed Jul. 12, 2018, which is hereby incorporated by reference wherein in its entirety.

What is claimed is:

1. A content generation device comprising:
   one or more hardware processors; and
   one or more memories storing one or more programs configured to be executed by the one or more hardware processors to implement:
   a first determination unit configured to determine whether each image of a plurality of images captured with a plurality of image capturing devices has an abnormality on a basis of data associated with each image; and
   a second determination unit configured to determine a type of content to be generated on a basis of the plurality of images captured with the plurality of image capturing devices among a plurality of types of content including a moving-image virtual viewpoint content in accordance with a determination of a presence or an absence of the abnormality.

2. The content generation device according to claim 1, wherein the or more memories store one or more programs configured to be executed by the one or more hardware processors to further implement:
   an acquisition unit configured to acquire a location of a virtual viewpoint and a direction from the virtual viewpoint; and
   a specification unit configured to specify, as an image of interest, an image required for generating the moving-image virtual viewpoint content on a basis of the location of the virtual viewpoint and the direction from the virtual viewpoint, wherein
   the first determination unit determines whether a specified image of interest is normal based on the determination of whether each image of the plurality of images captured with the plurality of image capturing devices has the abnormality, and
   the second determination unit determines the moving-image virtual viewpoint content as the type of content to be generated in accordance with a determination that the specified image of interest is normal.

3. The content generation device according to claim 2, wherein:
   the second determination unit further determines whether the specified image of interest is replaceable with an image that is not the specified image of interest in accordance with a determination that the specified image of interest is not normal; and
   the second determination unit determines the moving-image virtual viewpoint content as the type of content to be generated in accordance with a determination that the image is replaceable.

4. The content generation device according to claim 3, wherein:
   in accordance with a determination that the specified image of interest is not replaceable with the image that is not the specified image of interest, the second determination unit further determines whether an image of a preceding time of the specified image of interest is normal;
   in accordance with a determination that the image of the preceding time of the specified image of interest is normal, the second determination unit further determines whether an image of a succeeding time of the specified image of interest is normal; and
   in accordance with a determination that the image of the succeeding time of the specified image of interest is normal, the second determination unit determines to generate a slow reproduction image of a virtual viewpoint as the type of content to be generated.

5. The content generation device according to claim 4, wherein the second determination unit determines still-image virtual viewpoint content as the type of content to be generated in accordance with a determination that the image of the succeeding time of the specified image of interest is not normal.

6. The content generation device according to claim 1, wherein
   when the first determination unit determines that an image having an abnormality exists and an image required for generating the moving-image virtual viewpoint content is not specified, the second determination unit determines, as the type of content to be generated, a still image of one virtual viewpoint at a single time or a moving image by one of the plurality of image capturing devices, on a basis of a setting by an operator.

7. The content generation device according to claim 1, wherein the abnormality includes missing, redundancy, and an error of the data.

8. The content generation device according to claim 1, wherein the or more memories store one or more programs configured to be executed by the one or more hardware processors to further implement a generation unit configured to generate content by a generation method according to the type of content determined to be generated.

9. The content generation device according to claim 8, wherein the or more memories store one or more programs configured to be executed by the one or more hardware processors to further implement an output unit configured to output the content generated by the generation unit a generated content to a content distribution device.

10. A method for controlling a content generation device, the method comprising:

determining whether each image of a plurality of images captured with a plurality of image capturing devices has an abnormality on a basis of data associated with each image; and determining a type of content to be generated on a basis of the plurality of images captured with the plurality of image capturing devices among a plurality of types of content including a moving-image virtual viewpoint content in accordance with a determination of a presence or an absence of the abnormality.

11. A non-transitory computer-readable storage medium storing a computer program for causing a computer to execute a method for controlling a content generation device, the method comprising:

determining whether each image of a plurality of images captured with a plurality of image capturing devices has an abnormality on a basis of data associated with each image; and determining a type of content to be generated on a basis of the plurality of images captured with the plurality of image capturing devices among a plurality of types of content including a moving-image virtual viewpoint content in accordance with a determination of a presence or an absence of the abnormality.

\* \* \* \* \*